United States Patent [19]

Eichler et al.

[11] Patent Number: 4,631,838
[45] Date of Patent: Dec. 30, 1986

[54] DEVICE FOR A ROASTING CHAMBER FOR ROASTING GREEN COFFEE BEANS

[75] Inventors: Walter Eichler, Steinheim; Karlheinz Färber, Giengen; Elisabeth Fischer, Kammeltal/Behlingen, all of Fed. Rep. of Germany

[73] Assignee: Bosch-Siemens Hausgeraete GmbH, Munich, Fed. Rep. of Germany

[21] Appl. No.: 737,394

[22] Filed: May 23, 1985

[30] Foreign Application Priority Data

May 23, 1984 [DE] Fed. Rep. of Germany ....... 3419250

[51] Int. Cl.⁴ ............................................. F26B 17/10
[52] U.S. Cl. ........................................ 34/57 A; 34/79; 34/82; 34/85; 55/326; 55/46 S
[58] Field of Search ...................... 34/10, 57 A, 79, 82, 34/85, 225, 233; 55/321, 325, 326, 465

[56] References Cited

U.S. PATENT DOCUMENTS

| 2,069,193 | 1/1937 | Behr | 34/10 |
| 3,964,175 | 6/1976 | Sivetz | 34/10 |
| 4,096,640 | 6/1978 | Krambrock | 34/57 A |
| 4,484,064 | 11/1984 | Murray | 34/10 |
| 4,494,314 | 1/1985 | Gell | 34/10 |

FOREIGN PATENT DOCUMENTS 3217055 11/1983 Fed. Rep. of Germany.
2112626 7/1983 United Kingdom.

Primary Examiner—Albert J. Makay
Assistant Examiner—David W. Westphal
Attorney, Agent, or Firm—Herbert L. Lerner; Laurence A. Greenberg

[57] ABSTRACT

A roasting chamber for roasting green coffee beans with a heated air current flowing from a lower air inlet region to an upper air outlet region of the roasting chamber, includes a roasting-waste settling chamber disposed in the air outlet region, the settling chamber being in the form of a substantially horizontal annular receiving trough having a substantially vertical central air inlet opening formed therein, an air-permeable and coffee-waste particle-impermeable filter covering the receiving trough, and a supplemental cup-shaped trough disposed concentrically below the receiving trough, the cup-shaped trough having a larger diameter than the air inlet opening and having an edge region disposed at a distance from the receiving trough defining a radial air passage therebetween.

8 Claims, 1 Drawing Figure

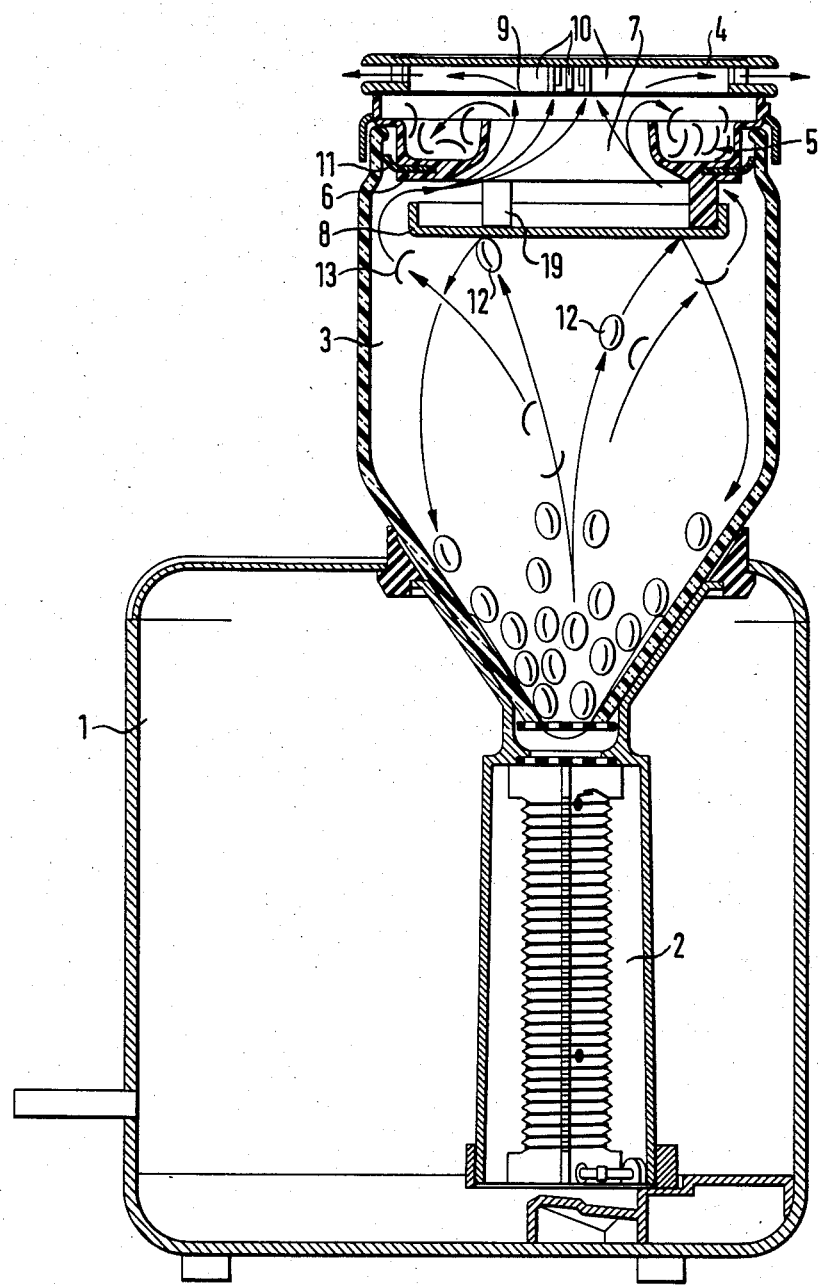

DEVICE FOR A ROASTING CHAMBER FOR ROASTING GREEN COFFEE BEANS

The invention relates to a device for a roasting chamber for roasting green coffee beans, especially in small quantities, with heated air which is heated in the lower region and flows vertically through the device escaping at the upper region, through the use of a roasting-waste settling chamber in the air discharge region.

Methods and devices for roasting green coffee beans, especially in small quantities, are known. For instance, it is known from German Published, Non-Prosecuted Application DE-OS No. 32 17 055, to swirl the coffee beans in the roasting chamber with an air current which is introduced into the roasting chamber in the heated state and which flows vertically from the bottom up through the chamber, thereby heating and roasting the coffee beans. The air is discharged from the roasting chamber in the cover region, after the air current has passed through a roasting-waste settling chamber and an air filter. The turbulence caused by the air current in the roasting-waste settling chamber frequently causes the air filter to be clogged rapidly, or causes the waste particles from the roasting process to fall back into the roasting chamber. Problems also arise from the fact that the cross sections of the air passages are made large enough to present as little air resistance as possible, such as for passage into and out of the roasting-waste settling chamber. However, the air passages must be dimensioned in such a way as to guaranty that none of the roasted beans reach the waste settling chamber and that none of the wastes from the chamber can fall back into the roasting chamber.

It is accordingly an object of the invention to provide a device for a roasting chamber for roasting green coffee beans, which overcomes the hereinafore-mentioned disadvantages of the heretofore-known devices of this general type, and to provide a roasting-waste settling chamber for a roasting chamber for roasting green coffee beans, through which the air can flow with a minimum resistance, and in which the roasting wastes are securely deposited. With the foregoing and other objects in view there is provided, in accordance with the invention, a roasting chamber for roasting green coffee beans, especially in small quantities, with a heated air current flowing from a lower air inlet region where it is heated, vertically up to an upper air outlet region of the roasting chamber, comprising a roasting-waste settling chamber disposed in the air outlet region, the settling chamber being in the form of a substantially horizontal annular receiving trough or receptacle having a substantially vertical central air flow inlet opening formed therein, a large area air-permeable and coffee-waste particle-impermeable filter covering the receiving trough, and a supplemental cup-shaped trough disposed concentrically vertically below the receiving trough, the cup-shaped trough having a larger diameter than the air inlet opening and having an edge region disposed at a distance from the receiving trough defining a radial air passage therebetween.

In a device according to the features of the invention, the air current is conducted from the roasting chamber in a meander-like path over a wide area through the cups forming the roasting-waste settling chamber, and is blown through the large filter to the outside. The generally large cross section obtained due to this construction, causes an optimally low resistance to the heated air current which is conducted through the roasting chamber, while the air current in the region of the settling chamber moves relatively slowly, i.e. it settles down. Due to this construction, the roasting wastes are preferably deposited in the annular receptacle. The roasting wastes reaching the large area filter also fall back again into the annular trough and into the cup-shaped trough. Contamination of the filter which could cause problems, is therefore avoided.

In accordance with another feature of the invention, there is provided a cover for the roasting chamber being integral with or removably joined to the settling chamber.

In accordance with a further feature of the invention, there is provided a cover for the roasting chamber being joined to the settling chamber with a bayonet connection. In this case, the settling chamber together with the cover of the roasting chamber can be removed from the roasting chamber. After the separation of the two parts, the cleaning and emptying of the roasting-waste settling chamber is especially easy.

In accordance with an added feature of the invention, the filter is disposed between the cover and the settling chamber. This makes it especially simple to change the air filter.

In accordance with a concomitant feature of the invention, there is provided a soft elastic ring disposed between the outer periphery of the settling chamber and the inner surface of the roasting chamber. This ring at the same time serves as means for securing the roasting-waste settling chamber along with the top cover to the roasting chamber and as a seal between the roasting-waste settling chamber and the wall of the roasting chamber.

Other features which are considered as characteristic for the invention are set forth in the appended claims.

Although the invention is illustrated and described herein as embodied in a device for a roasting chamber for roasting green coffee beans, it is nevertheless not intended to be limited to the details shown, since various modifications and structural changes may be made therein without departing from the spirit of the invention and within the scope and range of equivalents of the claims.

The construction and method of operation of the invention, however, together with additional objects and advantages thereof will be best understood from the following description of specific embodiments when read in connection with the accompanying single FIGURE of the drawing which is a diagrammatic, cross-sectional view of the roasting chamber according to the invention.

Referring now to the FIGURE of the drawing in detail, there is seen a device for roasting green coffee beans, including a roasting-waste settling or collecting chamber which forms the upper closure of a roasting chamber 3.

The functional or operative elements and components for generating and controlling a heated air current are disposed in a housing 1 of a coffee roasting appliance. The air current is blown from the bottom up over a heating coil 2 into the roasting chamber 3, which is disposed on top of the housing 1. The air current moves in such a way that the coffee beans are swirled upward in the center and fall downward at the sides, where they are again conducted toward the center. The top of the roasting chamber 3 is closed by a roasting-waste settling chamber 5 which is fitted with a cover 4. The roasting-waste settling chamber 5 is formed by a receiving trough or annular receptacle 6 with a central air inlet opening 7. The receptacle 6 is also connected to a cup-shaped trough or baffle cup 8 which is disposed in front of the air inlet opening and is spaced at a certain distance from the receptacle covering the inlet opening.

The baffle cup 8 is joined with the annular receptacle 6 by three studs 19 in order to form an integral unit. A filter 9 is fastened between the roasting chamber cover 4 and the outer annular wall of the annular receptacle 6; the filter 9 is permeable to air, but does not permit any wastes to pass through. The filter 9 is held against the air flow by ribs 10 in a star-shaped configuration, so that the air current entering through the filter 9 can escape to the sides through channels formed between the filter 9 and the cover 4.

A flat ring 11 made of a soft elastic material is disposed at the outer periphery of the roasting-waste settling chamber 5. The ring 11 lies against the inner surface of the wall of the roasting chamber 3, so that the roasting-waste settling chamber 5 is held and sealed against the roasting chamber 3.

The drawing shows that the coffee beans 12 which are whirled or swirled up by the entering air current are preferably moved in the direction toward the baffle cup 8 due to their inertia, while the lighter roasting-waste particles 13 follow the air current in the outer region of the roasting chamber 3, and flow into the roasting waste settling chamber 5.

We claim:

1. Roasting chamber for roasting green coffee beans with a heated air current flowing from a lower air inlet region to an upper air outlet region of the roasting chamber, comprising a housing having an air outlet formed therein in said air outlet region, a roasting-waste settling chamber disposed below said air outlet in the air outlet region, said settling chamber being in the form of a substantially horizontal annular receiving trough having a substantially vertical central air inlet opening formed therein, an air-permeable and coffee-waste particle-impermeable filter above said receiving trough, and a supplemental cup-shaped trough disposed concentrically below said receiving trough, said cup-shaped trough having a larger diameter than said air inlet opening and having an edge region disposed at a distance from said receiving trough defining a radial air passage therebetween.

2. Device according to claim 1, including a cover for the roasting chamber being integral with said settling chamber.

3. Device according to claim 1, including a cover for the roasting chamber being removably joined to said settling chamber.

4. Device according to claim 1, including a cover for the roasting chamber being joined to said settling chamber with a bayonet connection.

5. Device according to claim 3, wherein said filter is disposed between said cover and said settling chamber.

6. Device according to claim 4, wherein said filter is disposed between said cover and said settling chamber.

7. Device according to claim 1, including a soft elastic ring disposed between the outer periphery of said settling chamber and the inner surface of the roasting chamber.

8. Device according to claim 1, wherein said receiving trough is air and waste particle-impermeable.

* * * * *